B. M. DIVER.
VENTILATING SYSTEM FOR MOTOR VEHICLES.
APPLICATION FILED AUG. 11, 1919.
1,361,567.	Patented Dec. 7, 1920.
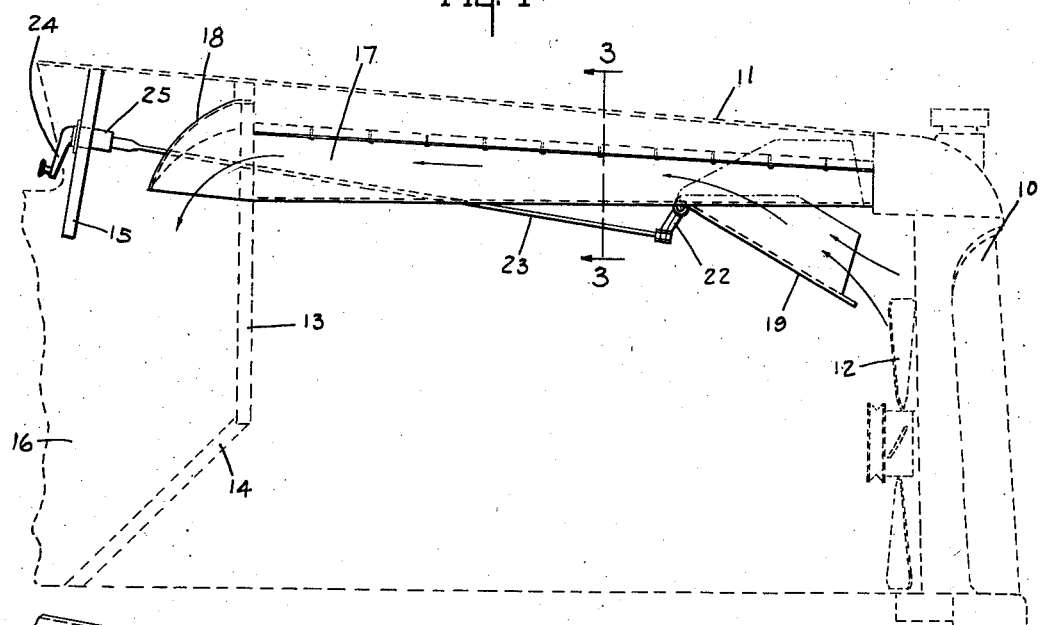
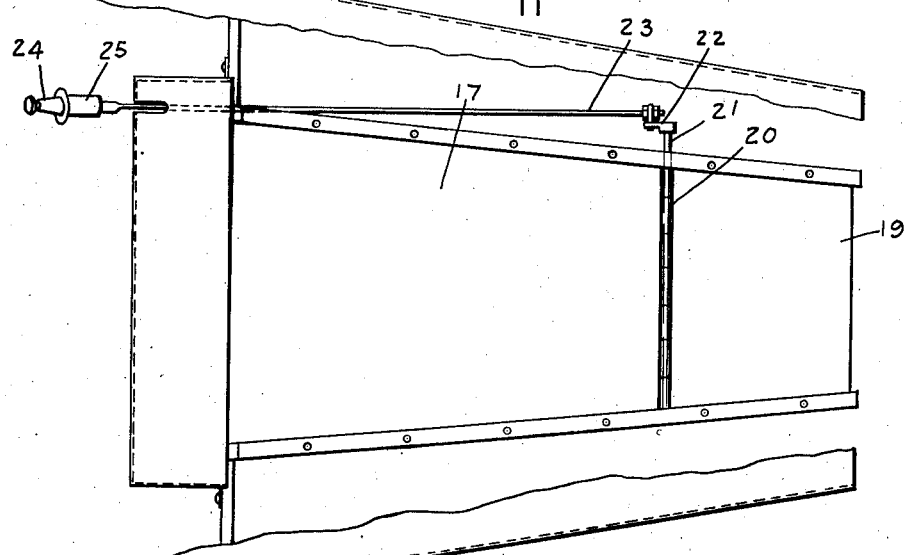
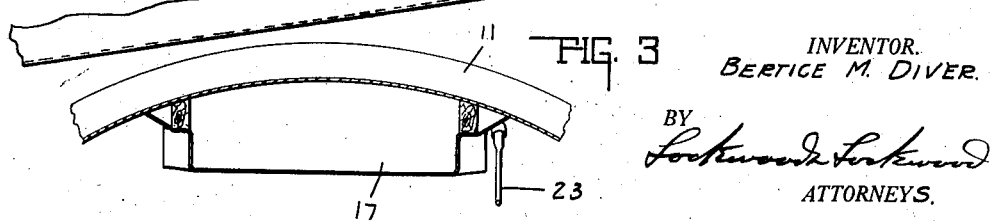
INVENTOR.
BERTICE M. DIVER.
BY
*Lockwood Lockwood*
ATTORNEYS.

UNITED STATES PATENT OFFICE.

BERTICE M. DIVER, OF INDIANAPOLIS, INDIANA.

VENTILATING SYSTEM FOR MOTOR-VEHICLES.

1,361,567.  Specification of Letters Patent.  Patented Dec. 7, 1920.

Application filed August 11, 1919. Serial No. 316,727.

*To all whom it may concern:*

Be it known that I, BERTICE M. DIVER, a citizen of the United States, and a resident of Indianapolis, county of Marion, and State of Indiana, have invented a certain new and useful Ventilating System for Motor-Vehicles; and I do hereby declare that the following is a full, clear, and exact description thereof, reference being had to the accompanying drawings, in which like numerals refer to like parts.

This invention relates to a ventilator for motor vehicles for providing a draft of air to be thrown on the foot board of the vehicle for cooling the occupants seated therein, and causing the current of fresh air to pass downwardly for carrying off the heat radiated from the motor through the floor of the front compartment.

The main object of this invention is to provide a ventilating system which will be completely hidden and will not be apparent from the outside of the vehicle and which will discharge the air between the dash and instrument board.

Another feature of the invention is the construction of a ventilating system whereby it may be controlled from the dash so as to utilize a part of the current produced by the fan and the fresh air passing through the radiator.

Referring to the drawings, which are made a part of this application, Figure 1 shows a side elevation of the ventilator system installed in a vehicle outlined in dotted lines. Fig. 2 is a plan view of a radiator with the top removed. Fig. 3 is a cross section taken on the line 3—3 of Fig. 1.

There is shown herein in dotted lines a motor vehicle having a radiator 10, a bonnet or hood 11, a fan 12, a dash 13, foot board 14 and instrument board 15, the front compartment being represented by 16. Secured on the hood along the upper portion thereof there is an air passage or chamber 17 which passes through the dash 13 and is provided with a curved end 18 for causing the air current passing therethrough to be discharged downwardly on to the foot board 14. In the front end of the passageway or chamber 17 there is a hinged portion 19 in the form of a trap or door which may be lowered, as shown in Fig. 1, which is hinged to the bottom of the passageway 17 by the transverse hinge 20. The portion 19 is adapted to be lowered so as to catch the current of air thrown rearwardly by the top of the fan 12, and also the air passing through the top part of the radiator 10, and scoop it up so as to cause it to pass rearwardly therethrough and be discharged downwardly on the foot board. The portion 19 is rigidly mounted on a shaft 21 which forms a part of the hinge 20, on the end of which is mounted an arm 22 connected with the rod 23 which passes rearwardly through the dash and instrument board so that it may be moved back and forth by turning the handle 24, which has a hub 25 internally threaded which engages the threads on the rod 23. As the handle is turned the rod 23 is screwed in or out of the hub 25, so as to give it a longitudinal movement which will cause the portion 19 to open or close and remain in its set position by the friction of the screw threads.

Such a ventilator construction may be secured to the top of the hood, as shown in Fig. 3, and a cooling draft obtained by the occupants of the vehicle where it is most needed, without there being any outward appearance thereof.

The invention claimed is:

1. The combination with an automobile having a hood inclosure, a radiator in the forward portion of said inclosure and a dash in the rear portion thereof, of a ventilating system including a chamber formed by a pan suspended from and rigidly secured to the top portion of the hood inclosure and extending longitudinally thereof through said dash, a damper hinged to the forward end of said pan and a rod passing through said dash and connected with said damper for controlling the air current passing through said chamber and dash into the automobile.

2. The combination with a motor vehicle having a hood and radiator, of a ventilating system including a longitudinally extending conduit mounted within the hood inclosure and rigidly secured to the top thereof so as to form a unit with said inclosure, said conduit extending into the motor vehicle for discharging an air current therein, and means for opening and closing said conduit for controlling the air current and ventilation of the vehicle.

In witness whereof, I have hereunto affixed my signature.

BERTICE M. DIVER.